United States Patent
Djuhera et al.

(10) Patent No.: US 12,489,544 B2
(45) Date of Patent: Dec. 2, 2025

(54) DYNAMICALLY APPLIED PROCESSES FOR MITIGATING ADVERSARIAL JAMMING ATTACK EVENTS

(71) Applicant: International Business Machines Corporation, Armonk, NY (US)

(72) Inventors: Aladin Djuhera, Dachau (DE); Swanand Ravindra Kadhe, San Jose, CA (US); Farhan Ahmed, San Jose, CA (US); Fernando Luiz Koch, Palm Beach Gardens, FL (US); Heiko H. Ludwig, San Francisco, CA (US); Alecio Pedro Delazari Binotto, Munich (DE)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 18/537,619

(22) Filed: Dec. 12, 2023

(65) Prior Publication Data

US 2025/0192913 A1 Jun. 12, 2025

(51) Int. Cl.
 H04K 3/00 (2006.01)
 H04L 9/40 (2022.01)

(52) U.S. Cl.
 CPC .......... H04K 3/22 (2013.01); H04L 63/1416 (2013.01)

(58) Field of Classification Search
 CPC .............................. H04K 3/22; H04L 63/1416
 See application file for complete search history.

(56) References Cited

U.S. PATENT DOCUMENTS

| 11,108,787 B1 * | 8/2021 | Shen | G06N 3/08 |
| 11,551,117 B1 | 1/2023 | Malhotra | |
| 2005/0156775 A1 * | 7/2005 | Petre | H03M 1/121 |
| | | | 341/123 |

(Continued)

FOREIGN PATENT DOCUMENTS

CN 112770291 A 5/2021

OTHER PUBLICATIONS

Duan et al., "Combined Federated and Split Learning in Edge Computing for Ubiquitous Intelligence in Internet of Things: State of the Art and Future Directions," arXiv, 2022, pp. 1-23, retrieved from https://arxiv.org/abs/2207.09611.

(Continued)

*Primary Examiner* — Abu S Sholeman
(74) *Attorney, Agent, or Firm* — Zilka-Kotab, P.C.

(57) ABSTRACT

A computer-implemented method (CIM), according to one embodiment, includes performing a detecting and monitoring adversarial jamming (MDJ) process for an edge environment that includes a first edge device and a central hub. In response to a determination that a jamming attack event is likely to occur, a pre-emptive edge user device protection process (PPP) is caused to be deployed. In response to a determination that a jamming attack event has occurred, a post-process jammed data (PJD) process is caused to be deployed at a recipient of a wireless transmission subject to the jamming attack event. The CIM further includes generating, based on results of deploying the PPP and/or the PJD process, a first set of new parameters for a model of a device that sent the wireless transmission, and causing the first set of new parameters to be distributed to the model of the device that sent the wireless transmission.

20 Claims, 4 Drawing Sheets

(56) References Cited

U.S. PATENT DOCUMENTS

| | | | | |
|---|---|---|---|---|
| 2015/0293234 | A1* | 10/2015 | Snyder | G01S 19/21 |
| | | | | 342/357.59 |
| 2019/0319970 | A1* | 10/2019 | Pickett | H04L 51/04 |
| 2021/0042631 | A1* | 2/2021 | Blinder | G06N 5/01 |
| 2021/0306856 | A1* | 9/2021 | Mildh | H04K 3/224 |
| 2022/0345484 | A1 | 10/2022 | Drozd et al. | |
| 2024/0080332 | A1* | 3/2024 | Ganesh | G06F 21/577 |

OTHER PUBLICATIONS

Ganguly et al., "Multi-Edge Server-Assisted Dynamic Federated Learning with an Optimized Floating Aggregation Point," arXiv, 2022, pp. 1-34, retrieved from https://arxiv.org/abs/2203.13950.

Yang et al., "Edge-Cloud Collaborative Defense against Backdoor Attacks in Federated Learning," Sensors, vol. 23, 2023, pp. 1=15.

Zhang et al., "Split Federated Learning: Speed up Model Training in Resource-Limited Wireless Networks," arXiv, 2023. 2 pages, retrieved from https://arxiv.org/abs/2305.18889.

Anonymous, "Model split based on population for Modular Federated Learning ModFL," IP.com Prior Art Database, Technical Disclosure No. IPCOM000271185D, Nov. 3, 2022, 6 pages.

Anonymous, "Mechanism and approach for seamless configuration and deployment of participant on the Edge devices for distributed learning," IP.com Prior Art Database, Technical Disclosure No. IPCOM000271538D, Jan. 3, 2023, 8 pages.

Anonymous, "Cognitive Drone Assistant and Guide using Federated Learning Edges," IP.com Prior Art Database, Technical Disclosure No. IPCOM000272139D, Apr. 19, 2023, 6 pages.

Doku et al., "Mitigating Data Poisoning Attacks On a Federated Learning-Edge Computing Network," IEEE 18th Annual Consumer Communications & Networking Conference (CCNC), 2021, 6 pages, retrieved from https://par.nsf.gov/servlets/purl/10279536.

Khan et al., "Security Analysis of SplitFed Learning," SenSys'22, ACM, Nov. 2022, 7 pages, retrieved from https://arxiv.org/pdf/2212.01716.pdf.

Nyamtiga et al., "Blockchain-Based Secure Storage Management with Edge Computing for IoT," Electronics, vol. 8, 2019, pp. 1-22.

Alam et al., "IoT Edge Computing and Blockchain for High-Performance and Decentralized Health Monitoring System," 2nd International Conference on Advancement in Electronics & Communication Engineering (AECE 2022) Jul. 2022, pp. 8-16.

\* cited by examiner

DYNAMICALLY APPLIED PROCESSES FOR MITIGATING ADVERSARIAL JAMMING ATTACK EVENTS

BACKGROUND

The present invention relates to malevolent adversarial jamming attack events in a split federated learning (SFL) system, and more specifically, this invention relates to dynamically performing pre-emptive and responsive processes for mitigating malevolent adversarial jamming attack events within an edge environment that includes at least one edge device and a central hub.

SFL systems facilitate edge devices, e.g., such as smartphones, Internet of Things (IoT) sensors, routers, routing switches, multiplexers, etc., to actively partake in decentralized machine learning activities. These edge devices are not only used to compute and fine-tune machine learning models, including foundation models (FMs), at the dynamic edge, but also relay crucial model parameters to a central hub, e.g., a 5G-public mobile edge computing (MEC) component, a cloud-server, etc., for consolidation and further processing. The distributed nature of SFL offers advantages in real-time analytics and efficient edge-artificial intelligence (AI) deployment.

SUMMARY

A computer-implemented method (CIM), according to one embodiment, includes performing a detecting and monitoring adversarial jamming (MDJ) process for an edge environment that includes a first edge device and a central hub. In response to a determination, based on results of performing the MDJ process, that a jamming attack event is likely to occur, a pre-emptive edge user device protection process (PPP) is caused to be deployed for preventing the jamming attack event. In response to a determination, based on the results of performing the MDJ process, that a jamming attack event has occurred, a post-process jammed data (PJD) process is caused to be deployed at a recipient of a wireless transmission subject to the jamming attack event. The CIM further includes generating, based on results of deploying the PPP and/or the PJD process, a first set of new parameters for a model of a device that sent the wireless transmission subject to the jamming attack event to the recipient, and causing the first set of new parameters to be distributed to the model of the device that sent the wireless transmission subject to the jamming attack event to the recipient.

A computer program product (CPP), according to another embodiment, includes a set of one or more computer-readable storage media, and program instructions, collectively stored in the set of one or more storage media, for causing a processor set to perform any combination of features of the foregoing methodology.

A computer system (CS), according to another embodiment, includes a processor set, a set of one or more computer-readable storage media, and program instructions, collectively stored in the set of one or more storage media, for causing the processor set to perform any combination of features of the foregoing methodology.

Other aspects and embodiments of the present invention will become apparent from the following detailed description, which, when taken in conjunction with the drawings, illustrate by way of example the principles of the invention.

DETAILED DESCRIPTION

Figure 1:
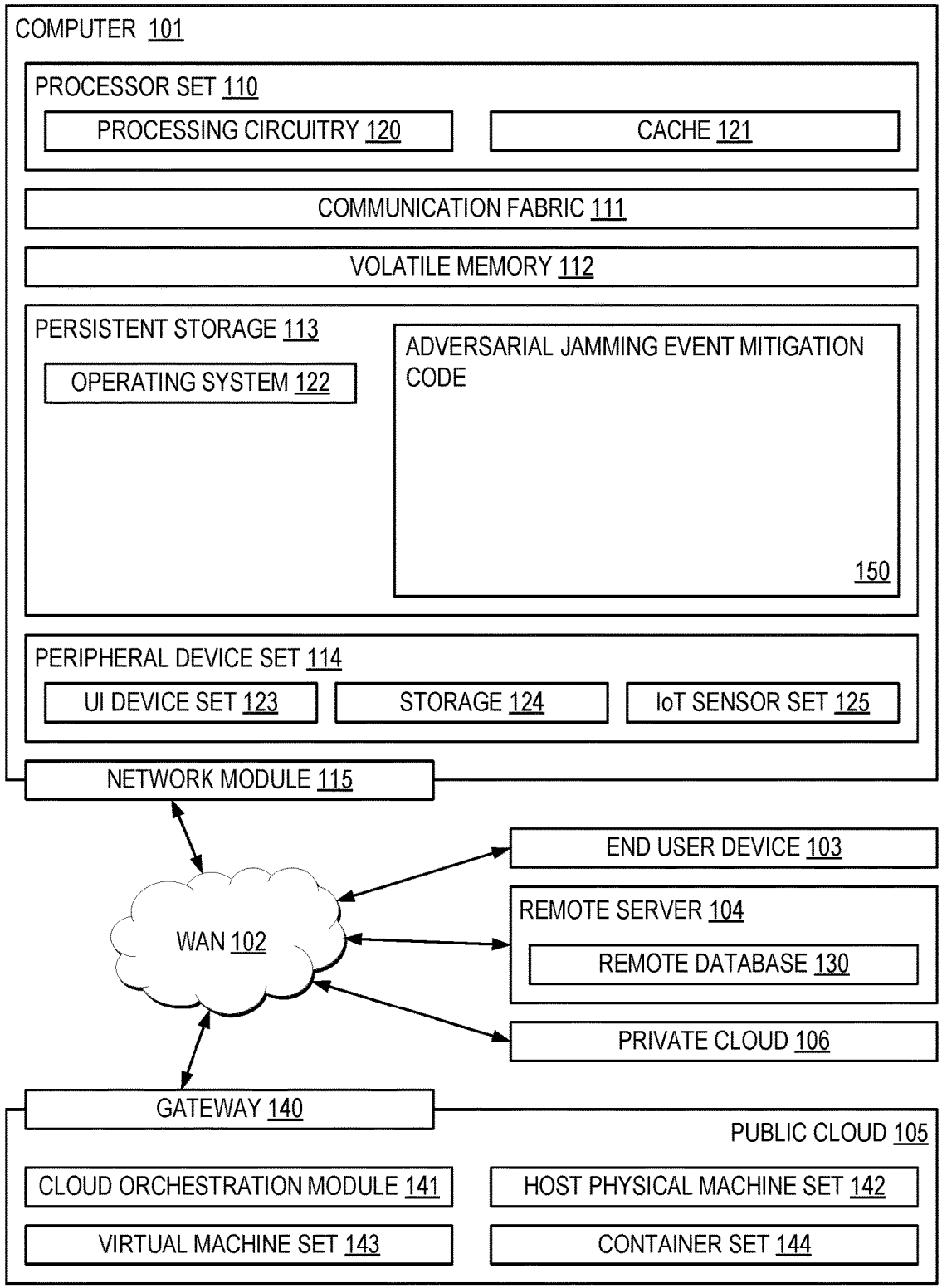
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing pre-emptive and responsive processes for mitigating malevolent adversarial jamming attack events within an edge environment that includes at least one edge device and a central hub.

In one general embodiment, a computer-implemented method (CIM) includes performing a detecting and monitoring adversarial jamming (MDJ) process for an edge environment that includes a first edge device and a central hub. In response to a determination, based on results of performing the MDJ process, that a jamming attack event is likely to occur, a pre-emptive edge user device protection process (PPP) is caused to be deployed for preventing the jamming attack event. In response to a determination, based on the results of performing the MDJ process, that a jamming attack event has occurred, a post-process jammed data (PJD) process is caused to be deployed at a recipient of a wireless transmission subject to the jamming attack event. The CIM further includes generating, based on results of deploying the PPP and/or the PJD process, a first set of new parameters for a model of a device that sent the wireless transmission subject to the jamming attack event to the recipient, and causing the first set of new parameters to be distributed to the model of the device that sent the wireless transmission subject to the jamming attack event to the recipient.

In another general embodiment, a computer program product (CPP) includes a set of one or more computer-readable storage media, and program instructions, collectively stored in the set of one or more storage media, for causing a processor set to perform any combination of features of the foregoing methodology.

In another general embodiment, a computer system (CS) includes a processor set, a set of one or more computer-readable storage media, and program instructions, collectively stored in the set of one or more storage media, for causing the processor set to perform any combination of features of the foregoing methodology.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as adversarial jamming attack event mitigation code of block 150 for performing pre-emptive and responsive processes for mitigating malevolent adversarial jamming attack events within an edge environment that includes at least one edge device and a central hub. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, SFL systems facilitate edge devices, e.g., such as smartphones, IoT sensors, etc., to actively partake in decentralized machine learning activities. These edge devices are not only used to compute and fine-tune machine learning models, including FMs, at the dynamic edge, but also relay crucial model parameters to a central hub, e.g., 5G-MEC, cloud-server, etc., for consolidation and further processing. The distributed nature of SFL offers advantages in real-time analytics and efficient edge-AI deployment.

The distributed nature of SFL also tends to expose edge-to-cloud systems of the edge-AI deployment to a plethora of vulnerabilities. For example, adversarial jammers present a pressing concern throughout the field of edge-AI deployment, and primarily target wireless transmission within these edge systems. These jammers are sometimes capable of introducing noise and manipulating data in transition, e.g., between an edge device and a central hub. An illustrative example of malevolent adversarial jamming includes the alteration of edge data labels from the correct label to an incorrect label, e.g., an alteration of "dangerous" to "safe" label, causing deterioration in model performance, data collected at the edge to not be able to be used, heightened security risks, and inconsistent AI-powered decision making at the dynamic edge.

Existing defenses to malevolent adversarial jamming, which are typically designed for non-distributed and non-edge platforms, fall short in protecting SFL systems from the dynamic challenges posed by the wireless environment. These limitations of conventional defenses are accentuated by so-called "smart jammers". For context, smart jammers are malevolent adversarial jammers which may be capable of re-targeting edge users and/or which may compromise multiple users at the same time. Adding to this complexity, the mobile nature of cellular edge devices introduces further unpredictability. For at least these reasons, conventional defense measures fail to mitigate the performance impacts that malevolent adversarial jamming actors and events cause within edge-AI deployment environments and more specifically, edge-AI deployment environments that include SFL systems. Accordingly, there is a longstanding need for dynamic, adversary-resistant defense mechanisms for distributed SFL systems, both for cloud-out-to-edge and edge-in-to-cloud operations. More specifically, conventional defense techniques fail to efficiently detect sophisticated adversaries such as jammers, purify impaired data signals, and reinforce nearby or mobile edge-to-server connections. In particular, given the fact that SFL edge systems may train relatively large transformer-based FMs which involve the transfer of relatively sensitive embeddings over wireless channels, this longstanding need for dynamic, adversary-resistant defense mechanisms for distributed SFL systems becomes paramount.

In sharp contrast to the deficiencies of the conventional techniques described above, techniques of various embodiments and approaches described herein address the longstanding need for dynamic, adversary-resistant defense mechanisms for distributed SFL systems. More specifically, the techniques of embodiments and approaches described herein continuously detect adversarial jamming in wireless edge environments, post-process and cleanse impaired data at the server-end (thereby ensuring the integrity of received sensitive embeddings), preemptively secure un-impaired edge devices from potential future threats (leveraging the insights from detected adversaries at the edge), and relatively fairly aggregate each edge user's model parameters in the SFL process to reflect their respective importance due to the various countermeasures applied.

Figure 2:
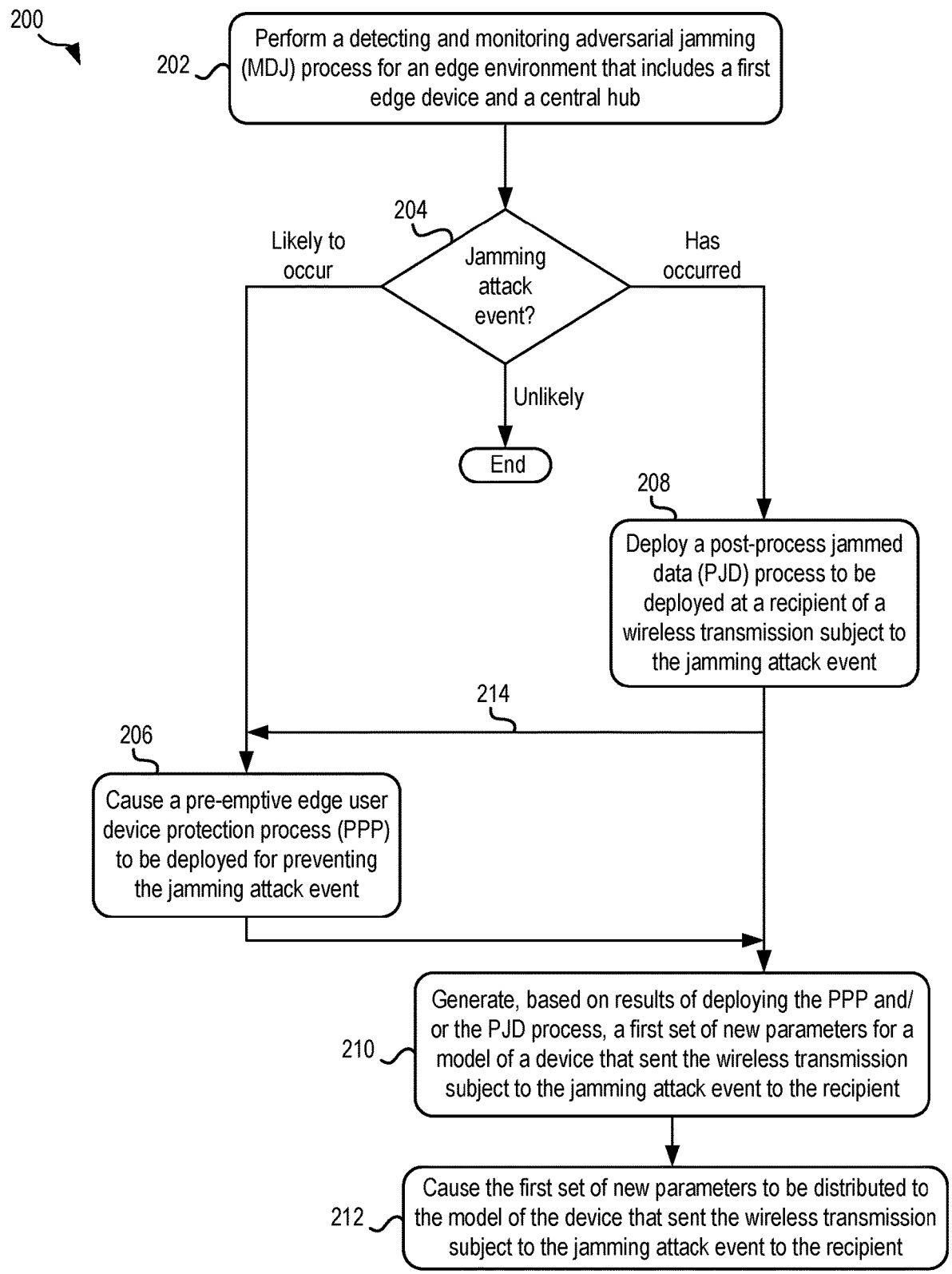
FIG. 2 is a flowchart of a method, in accordance with one embodiment of the present invention.

Now referring to FIG. 2, a flowchart of a method 200 is shown according to one embodiment. The method 200 may be performed in accordance with the present invention in any of the environments depicted in FIGS. 1-4, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may, in some preferred approaches, be performed in an edge environment that includes at least one edge device and a central hub, e.g., a cloud server. According to one specific use case, the edge environment may include SFL edge network in which multiple edge devices, e.g., client devices, train a representative transformer model. In this setup, the edge devices may compute embeddings at respective edge sites and transmit the embeddings in an uplink (UL), e.g., via a wirelessly transmitted signal, to the central hub, which finishes the forward propagation and initiates the backpropagation. In some approaches, after a specified amount of training epochs, the central hub may aggregate and federate the model parameters of all edge devices, resulting in a federated learning process. During this scenario, an adversarial wireless jammer may attempt to attack the transmitted embeddings in the UL by using targeted and/or random noise injection (during which the jammer perturbs the embeddings accordingly). The techniques of embodiments and approaches described herein prevent this attack from becoming a potential backdoor that would otherwise allow the jammer to poison the specific edge model and/or the wireless transmissions to be exploited later by the same or other adversaries. Accordingly, these novel techniques sit in an intersect between edge computing and IoT security, machine learning and AI security, and distributed systems and edge computing.

Furthermore, it may be prefaced that the operations of method 200 include a plurality of processes that may be dynamically applied depending on one or more determined conditions within the edge environment. For example, as will be described in greater detail below, these processes may include performing a first process in response to a determination that a jamming attack event has occurred, while in contrast, a second process may be performed in response to a determination that a jamming attack event has not occurred but is relatively likely to occur. In some preferred approaches, these processes include a first process for monitoring for and detecting adversarial jamming (herein also referred to as a "detecting and monitoring adversarial jamming process" or "MDJ process"), a second process to post-process jammed data at a recipient of a wireless transmission subject to the jamming attack event (herein also referred to as a "post-process jammed data process" or "PJD process"), a third process to preemptively protect un-jammed SFL parties (herein also referred to as a "pre-emptive edge user device protection process" or "PPP"), and a fourth process for weighted model federation (herein also referred to as the "weighted model federation process" or "WMF" process).

Operation 202 of FIG. 2 includes performing the MDJ process. The MDJ process may be performed for an edge environment (such as the edge environment described elsewhere above). The edge environment may, in some approaches, include a SFL system with at least a first edge device and a central hub. In some preferred approaches, the SFL system includes a plurality of edge devices including the first edge device and one or more other edge devices. The edge devices may be in communication with one or more edge devices, and each of the edge devices is preferably in communication with the central hub.

The MDJ process, in some approaches, provides a method to measure, monitor and quantify the impact of an adversarial jammer within a cellular wireless system. The MDJ process, in some approaches, is performed as follows. In order to be able to distinguish normal wireless transmissions of data from compromised, e.g., jammed, wireless transmissions of data, in some approaches, the MDJ process includes evaluating wireless transmissions within the edge environment. In order to evaluate these wireless transmissions, method 200 may include obtaining information about the edge environment, and more specifically, information about the devices and wireless transmissions of data that occur within the edge environment. Accordingly, in some approaches, capacity parameters, wireless system parameters and/or other key performance indicators (KPIs) within a cellular network may be obtained. These parameters and performance indicators may, in some approaches, include, e.g., a signal to noise ratio (SNR), a signal to interference plus noise ratio (SINR), a bit error rate (BER), throughput, signal processing, etc. In some approaches, the parameters and performance indicators may be determined using proprietary software and/or software built-into predetermined monitoring devices within the edge environment. In some other approaches, the parameters and performance indicators may additionally and/or alternatively be provided by 5G gNodeB/4G eNodeB performance management (PM) systems of a type that would become apparent to one of ordinary skill in the art after reading the descriptions herein. The parameters and performance indicators may additionally and/or alternatively be obtained from standardized wireless technologies such as open radio access network (O-RAN) interfaces, Operations Support Systems (OSS), etc. Yet furthermore, the parameters and performance indicators may additionally and/or alternatively be obtained using services of a type that would become apparent to one of ordinary skill in the art after reading the descriptions herein, that are configured to identify predetermined conditions occurring within the edge environment, e.g., within a 5G network slice (when mission-critical), virtualized network function VNF (when flexibility is demanded), 5G-MEC (when low latency is required), etc.

Evaluation of the wireless transmissions within the edge environment for performing the MDJ process may additionally and/or alternatively include obtaining one or more wireless baseline measurement(s). For context, these wireless baseline measurement(s) may, in some approaches, be measurements of wireless transmissions and/or other informational measurements within the edge environment, that are performed while the edge environment is in a controlled setting, e.g., while jammers are known to not be attempting to perform jamming attack events within the edge environment. In some approaches, the wireless baseline measurement(s) may be obtained using one or more of the measurement capacity and functionalities described above, e.g., PM systems, an O-RAN interface, etc. In some other approaches, the wireless baseline measurement(s) may additionally and/or alternatively be obtained during system initialization, system calibration, provided baseline intervals, etc., which may be times during which jammers are known to not be attempting to perform jamming attack events within the edge environment. The one or more wireless baseline measurement(s) may, in some approaches, additionally and/or alternatively be obtained from one or more storage devices. For example, the one or more wireless baseline measurement(s) may be obtained with and/or as logged KPIs and parameters, e.g., SNR, SINR, BER, etc., which may be provided in a database at a base station, the central hub, a MEC device such as the first edge device, etc.

Continuous wireless monitoring and/or system updates are additional and/or alternative avenues that may be used to evaluate the wireless transmissions within the edge environment for performing the MDJ process. For example, in some approaches, measurement capacity and functionalities described elsewhere above, e.g., such as OSS may be used to perform continuous wireless monitoring of the edge environment. Furthermore, pre-defined update intervals may be tracked in order to understand when system parameters within the edge environment change. Updates logged alongside the baseline measurements in a provided database at a base station and/or an MEC device may additionally be considered to determine parameters and performance indicators of the edge environment.

Results of performing spectrum analysis of a type that would become apparent to one of ordinary skill in the art after reading the descriptions herein may be obtained and considered in order to evaluate wireless transmissions within the edge environment. In some approaches, these results may be obtained and/or spectrum analysis may be performed using one or more of the measurement capacity and functionalities described above, e.g., 5G gNodeB's built-in capabilities. These results may be evaluated using techniques that would become apparent to one of ordinary skill in the art after reading the descriptions herein for anomaly detection regarding persistent high-energy signals outside of expected communication patterns. A specification of a signal profile may additionally and/or alternatively be included in these results. The specification may detail information about the signal such as, e.g., relative strength of the signal, noise characteristics, angles of arrival and possible location, measured and estimated values determined via built-in multiple-input multiple-output (MIMO) beamforming and detection algorithms, etc.

Performing the MDJ process for the edge environment may additionally and/or alternatively include cross referencing the behavior of components of the edge environment and/or measurements taken within the edge environment with other known devices. For example, in some approaches, measurement capacity and functionalities described elsewhere above, e.g., context management systems in 5G gNodeB, may be used to compare components of the edge environment with other known devices in order to determine whether behavior of components of the edge environment and/or measurements taken within the edge environment are considered relatively abnormal (indicative of occurrence of a jamming attack event within the edge environment) or relatively normal (indicative of a lack of an occurrence of a jamming attack event within the edge environment). Cross referencing the behavior of components of the edge environment and/or measurements taken within the edge environment with other known devices may, in some approaches, be performed by continuously comparing real-time traffic profiles and detected anomalies (such as ones provided by a spectrum analysis) against stored user device profiles. In some approaches, one or more outcomes of mismatches between user profiles and measured signals may be indicative of an abnormality being present within the edge environment.

The evaluation of wireless transmissions within the edge environment may, in some approaches, be based on given alerts of rapid fluctuations in channel state information (CSI). This evaluation may, in some approaches, include using measurement capacity and functionalities described elsewhere above, e.g., MIMO CSI-feedback and gNodeB OSS. In some approaches, in response to a determination that a sudden change occured in the CSI with logged variations unattributable to common physical or network disturbances, an abnormality may be determined to be present within the edge environment.

Feedback results of devices that are associated with wireless transmissions within the edge environment may additionally and/or alternatively be considered for evaluation of wireless transmissions within the edge environment. More specifically, in some approaches, measurement capacity and functionalities techniques described elsewhere herein, e.g., radio resource control (RRC) feedback, may be collected. In order to evaluate wireless transmissions within the edge environment, the feedback may be examined for signs of relatively extreme interference and unexpected performance degradation. These signs may be indicative of an abnormality being present within the edge environment.

With one or more types of the information described above obtained as a result of evaluating wireless transmissions within the edge environment, the MDJ process, in some preferred approaches, includes identifying, based on results of the evaluation, anomalies that have occurred during the wireless transmissions. For context, the identified anomalies may be determined to be associated with jamming attack events. In some approaches, the MDJ process of method 200 may include identifying the presence and influence of an adversarial jammer anomaly by implementing an ML model for real-time identification, jammer prediction and wireless system state classification based on historical data and patterns of detected jammers using time series forecasting models, e.g., an autoregressive integrated moving average (ARIMA) model, a long short-term memory (LSTM) networks, transformers, etc., or anomaly detection models, e.g., isolation forest, one-class support vector machines (SVM), autoencoders, etc. In one or more of such approaches, the model may be taken as a given input to the MDJ process which can be provided as part of a cellular foundation model. In some alternative approaches, by pre-emptively augmenting previous rule-based decision systems incorporating thresholds for above KPI, anomaly and monitoring measurement results may be obtained and thereby used to identify an anomaly.

In some approaches, in response to identifying anomalies that have occurred during the wireless transmissions, a dynamic response alert of a type that would become apparent to one of ordinary skill in the art after reading the descriptions herein may be issued. The response alert may include recommended counteractions to perform, e.g., such as readjusting spectrum allocation and other parameters. One or more of the counteractions may be applied through dynamic spectrum sharing (DSS), self-organizing networks (SON), etc. The dynamic response alert may additionally and/or alternatively include a characterization and specification of a jammer determined to be associated with the determined anomaly. For example, in some approaches, the characterization and specification of the jammer may be based on accumulated power measurements, angle of arrival data, spectrum analysis results, triangulation results, etc.

The MDJ process may include determining, based on the identified anomalies, the edge devices that are potentially under threat of jamming attack events and a potential range of the jamming attack events. In other words, with the characterization and specification of the jammer determined, characteristics of the edge devices and/or the central hub and any wireless transmissions between the edge devices and/or the central hub may be evaluated to determine whether the jammer is capable of and/or likely to have already compromised wireless transmissions within the edge environment. In some approaches, in order to determine the edge devices that are potentially under threat of jamming attack events and a potential range of the jamming attack events, the MDJ process includes comparing spectrum analysis, cross-reference and device feedback results and correspondingly issuing a rating or attack probability for devices, e.g., which may include one or more edge devices and/or the central hub, nearby or with similar transmission characteristics and patterns as the currently jammed device. Spectrum analysis comparison techniques that would become apparent to one of ordinary skill in the art after reading the descriptions herein may be used.

The MDJ process may also include constructing, for each of the edge devices, a probability mapping. The results of the potential attack analysis are used to construct these probability mappings. For context, each of the probability mappings preferably detail, for an associated one of the edge devices, a likelihood of the jamming attack events affecting the associated edge device. In other words, the probability mappings preferably detail edge device behavior and/or configurations that are relatively likely to be attacked by a jammer rather than detailing jamming attack events that are determined to have occurred. The probability mappings, in some preferred approaches, include insights about the potential jamming attack events and/or jammers, e.g., such as characteristics of noise generated by jammers, aspects of a wireless transmission that are vulnerable to known types of jammers, etc. These insights include information which is able to be fed back into a ML model (such as the ML model described elsewhere above) and/or rule-based decision system in order to train the ML model how to identify whether a jamming attack event has occurred and/or is relatively likely to occur. According to some illustrative approaches, the insights may include information such as, e.g., behavior of a malevolent device that initiates at least one of the jamming attack events, signal strength of a wireless transmission subject to the jamming attack event, etc. These insights may additionally and/or alternatively include a list of the edge devices (and/or the central hub) that are threatened by the jamming attack event. For context, an edge device and/or the central hub may be threatened by the jamming attack event based on the edge device and/or the central hub having their wireless transmission jammed by one of the jamming attack events and/or based on the edge device and/or the central hub receiving a wireless transmission that has already been jammed by one of the jamming attack events.

Results of performing the MDJ process, e.g., such as insights of the probability mappings, are used to determine, for a given one of the edge devices such as the first edge device, whether a jamming has occurred, is relatively likely to occur, or is relatively unlikely to occur, e.g., see decision 204. In response to a determination that a jamming attack event is unlikely to occur and has not occurred, e.g., as illustrated by the "Unlikely" logical path of decision 204, method 200 optionally ends, e.g., see End. In some approaches, a determination may be made that a jamming attack event is unlikely to occur and has not occurred in response to a determination that, e.g., a predetermined jammer characteristic is not identified within the results of performing the MDJ process, a predetermined amount of noise is not detected within one or more wireless transmissions within the edge environment evaluated while performing the MDJ process, etc.

A determination may alternatively be made, in some approaches, based on results of performing the MDJ process, that a jamming attack event has occurred and/or is expected with at least a predetermined degree of certainty to have occurred (exceeding a predetermined threshold of certainty) during transmission of data via a wireless signal between the first edge device and the central hub. In some preferred approaches, in response to a determination, based on the results of performing the MDJ process, that a jamming attack event has occurred and/or is expected with at least a predetermined degree of certainty to have occurred, e.g., as illustrated by the "Has occurred" logical path of decision 204, a PJD process is caused, e.g., instructed, delivered as a sequence of code with instructions to execute the code, performed, etc., to be deployed at a recipient of a wireless transmission subject to the jamming attack event, e.g., see operation 208. It should be noted that, because wireless transmission may be sent from edge devices of the edge environment to the central hub, and vice versa, the recipient of a wireless transmission subject to the jamming attack event may depend on the approach. For example, for an approach in which the wireless transmission subject to the jamming attack event is wirelessly transmitted to the central hub by the first edge device, the first edge device is the device that sent the wireless transmission subject to the jamming attack event to the recipient, and the recipient is the central hub. In contrast, for an approach in which the wireless transmission subject to the jamming attack event is wirelessly transmitted to the first edge device by the central hub, the central hub is the device that sent the wireless transmission subject to the jamming attack event to the recipient, and the recipient is the first edge device.

For context, the PJD process applies various data analytics and processing steps to eliminate the influence of a jammer and a jamming attack event as much as possible, in addition to measuring the overall impact of the jamming attack event that has occurred. The PJD process may, in some approaches, include identifying and evaluating data of the wireless transmission subject to the jamming attack event. The wireless transmission subject to the jamming attack event may be considered input data for the PJD process, and may, upon being received by the recipient, contain a mix of legitimate and adversarialy manipulated data. For example, the data of the wireless transmission may include first data that the sender of the wireless transmission sent, and furthermore, the data of the wireless transmission may include second data that a jammer malevolently incorporated into the wireless transmission during the jamming attack event.

In some approaches, a preliminary data-centric analysis of an input distribution of the data may be performed. This analysis may, in some approaches, be performed in order to determine whether a jamming attack event has occurred. Results of the preliminary data-centric analysis may, in some approaches, include histograms, kernel density estimation (KDE) plots, statistical tests (Kolmogorov-Smirnov), descriptive statistics (mean, variance, skewness, etc.), box plots, etc. The preliminary data-centric analysis of the input distribution of the data may additionally and/or alternatively include comparing data of the wireless transmission subject to the jamming attack event against a baseline of the un-jammed or a data distribution that would be expected in a scenario in which the wireless transmission was otherwise not subject to the jamming attack event. Results of an inherent classification of whether or not an adversarial manipulation has occurred on the wireless transmission may additionally and/or alternatively be performed for the preliminary data-centric analysis. For example, a detection of data anomalies may be used to identify outlier data and/or that the wireless transmission was compromised by the jamming attack event. The preliminary data-centric analysis of an input distribution of the data may also, in some approaches, result in guidance for clustering that is to be thereafter performed by determining parameters and metrics for clustering algorithms, e.g., such as the number of clusters "K" or the (eps, min_samples) pair for DBSCAN. Accordingly, available implementations of clustering algorithms such as K-Means, DBSCAN, etc., may be used in the PJD process, in some approaches.

The PJD process, in some approaches, proceeds by determining an optimal clustering of data of the wireless transmission subject to the jamming attack event. The determination of the optimal clustering of the data of the wireless transmission subject to the jamming attack event, in some approaches, incorporates potential clustering guidance from the previous data-centric analysis of the input distribution. In some approaches, this includes evaluating potential clustering guidance from previously performed data-centric analysis of an input distribution previously performed by a predetermined machine learning model. This guidance may be incorporated into the clustering determination using techniques that would become apparent to one of ordinary skill in the art after reading the descriptions herein, e.g., using correlation techniques, incorporating feedback learned from previously iterations of performing method 200 and/or the PJD process, etc. Clustering parameters may also be determined to thereafter use for determining the optimal clustering of the data. An illustrative list of these clustering parameters includes, e.g., the number of appropriate clusters K (such as number of classes, categories, features, etc.), (eps, min_samples) pairs, etc.

The determination of the optimal clustering of the data of the wireless transmission subject to the jamming attack event, in some preferred approaches, includes selecting a clustering algorithm to use for determining the optimal clustering of the data. Selection of the clustering algorithm, in some approaches, includes matching the determined clustering parameters and/or one or more other available prerequisites to an available clustering algorithm. The available clustering algorithm may be one of a plurality of available clustering algorithms that are available based on being in a predetermined list. The selected clustering algorithm is caused, e.g., a run instruction is issued, etc., to be run on the data of the wireless transmission subject to the jamming attack event. As a result of running the selected clustering algorithm, portions of the data, e.g., points, that lie outside the determined clusters, especially in regions of relatively low data density (in case of algorithms like DBSCAN), are identified as outliers. Such outliers are potential candidates for corrupted data introduced by the adversarial jamming attack event.

Subsequent to running the selected clustering algorithm, the PJD process, in some approaches, includes applying post-processing and outlier detection using techniques that would become apparent to one of ordinary skill in the art after reading the descriptions herein. According to some more specific approaches, applying post-processing and outlier detection may include discarding portions of the data that are identified during the determination of the optimal clustering to qualify as outliers. These portions of the data are discarded as they are assumed to be corrupted. In some approaches, one or more further investigative operations may be performed on these outliers via other methods, e.g., such as isolation forest, once-class SVM, etc., which may determine an authenticity of the data using known prior knowledge.

The PJD process may additionally and/or alternatively include determining a quantification of a cleansing impact that performing the PJD process has on the data of the wireless transmission subject to the jamming attack event. In some preferred approaches, the quantification of a cleansing impact is determined by calculating a predetermined ratio. More specifically, in at least some of such approaches, the predetermined ratio is based on the amount of data that exists before performing one or more steps of the PJD process, and an amount of data that exists after performing one or more steps of the PJD process. For example, in some approaches, the predetermined ratio (alpha) has a numerator that is an amount of the data that was received by the recipient (before cleaning of the data). Moreover, in some approaches, a denominator of the predetermined ratio is an amount of the data that exists after discarding the portions of the data (after cleaning of the data) that are identified during the determination of the optimal clustering to qualify as outliers. In other words, the predetermined ratio serves as a metric to indicate the proportion of data retained post cleansing of the data. The predetermined ratio, in some approaches, provides insights into the impact of jamming and the efficacy of the cleansing process. Furthermore, in federated learning scenarios, the determined predetermined ratio may be used in weighting model contributions during aggregation, potentially reducing the contribution of relatively heavily jammed datasets.

With reference again to decision 204 of method 200, in some approaches, a determination is made, based on results of performing the MDJ process, that a jamming attack event is relatively likely to occur during transmission of data via a wireless signal between the first edge device and the central hub within the edge environment, e.g., see the "Likely to occur" logical path of decision 204. In some preferred approaches, in response to a determination, based on results of performing the MDJ process, that a jamming attack event is likely to occur during transmission of data via a wireless signal between the first edge device and the central hub, but has not yet occurred, the PPP is caused to be deployed for preventing the jamming attack event, e.g., see operation 206.

The PPP provides operative steps for applying data-poisoning protection mechanisms to preemptively protect parties, e.g., edge devices, the central hub, etc., which are determined to be relatively highly likely to be jammed during a jamming attack event. It should be noted that logical path 214 flows from operation 208 to indicate that, in some iterations of method 200, the PPP may optionally be performed in addition to performing the PJD process, e.g., to prevent further jamming attack events from occurring subsequent to a jamming attack event occurring.

The determination that a jamming attack event is relatively likely to occur during transmission of data via a wireless signal between the first edge device and the central hub within the edge environment may, in some approaches, be made by considering the data before being transmitted, e.g., the embedding vectors. Moreover, the determination may additionally and/or alternatively be based on the results of performing the MDJ process. For example, the probability mappings from the MDJ process may include an assessment of each edge device's risk of being either directly targeted by a jammer and/or at risk of being targeted relatively soon, e.g., due to moving of either party. In some approaches, predetermined thresholds may be applied to the insights about the jamming attack events and/or other information of the mappings in order to make such determinations, e.g., one or more of the predetermined thresholds being exceeded may be cause to determine that a given edge device is at risk of being either directly targeted by a jammer and/or at risk of being targeted relatively soon.

Deployment of the PPP, in some approaches, additionally and/or alternatively, includes determining a suitable number of redundant samples to be added to data that is thereafter, e.g., scheduled, queued, currently being transmitted, etc., to be wirelessly transmitted between the first edge device and the central hub. In some approaches, this "suitable" number of redundant samples may be determined via baselines such as fixed redundancy due to prior knowledge and/or initial testing. For example, in some approaches, the suitable number of redundant samples to be added to data may be a predetermined fraction of a baseline of the data. In another approach, the suitable number of redundant samples may be determined variably using results of performing the MDJ process such that edge devices with a relatively higher jamming likelihood are caused to have relatively higher redundancy levels, while edge devices with a relatively lower jamming likelihood are caused to have relatively lower redundancy levels. The suitable number of redundant samples to be added to data may additionally and/or alternatively be determined using statistical methods such as confidence intervals or bootstrapping, and/or may be determined using one or more other heuristics due to system knowledge or present noise levels.

An intentional noise level to add to the data may additionally and/or alternatively be determined for deployment of the PPP. The intentional noise level to add to the data may, in some approaches, be determined as a scale using information about the jammer noise level from the MDJ process. Furthermore, the intentional noise level may additionally and/or alternatively be determined by other heuristics due to system knowledge or present noise levels.

Randomized smoothing may, in some approaches, be applied during wireless transmission of the data between the first edge device and the central hub. The randomized smoothing may be applied to a signal during wireless transmission by creating redundant samples via duplicating each data point as per the specified redundancy level. In some approaches, the randomized smoothing may additionally and/or alternatively be applied to a signal during wireless transmission by generating intentional noise sampled from a Gaussian distribution (and/or other zero-mean distributions) with the determined noise level, e.g., standard deviation. Relatively noisy samples may, in some approaches, be created via adding the generated noise to the redundant samples thereby creating multiple noisy versions of each data point.

The PPP may, in some approaches, then include applying data clustering (as described in PJD process) after and in response to a determination that the data has been wirelessly transmitted between the first edge device and the central hub. For context, in some approaches, applying data clustering may include identifying portions of the data that qualify as outliers from a remainder of the data, and instructing a recipient of the data wirelessly transmitted between the first edge device and the central hub to ignore the identified portions of the data. It may again be noted that the "recipient" depends on whether the data was received by the central hub or alternatively received by the first edge device during the transmission.

Method 200 preferably includes performing the WMF process which provides operative steps to federate participating client models of the edge devices and/or central hub with an added weight parameter representing the importance of the respective model contribution considering the applied countermeasures. The WMF process, in some approaches, is performed in response to a determination that a predetermined type of flag is present. For example, in some approaches, the predetermined flag may be indicative of whether data-cleansing and augmentation has been processed due to the edge device being adversarialy targeted. Accordingly, in one or more of such approaches, such a flag may be provided as an output of the PJD method being performed.

In some approaches, the quantification of the data cleansing impact, and more specifically, the data ratio (provided by the PJD method) for an edge device that is a recipient of the wireless transmission subject to the jamming attack event may be used in the WMF process. For example, the WMF process may, in some approaches, include generating, based on results of deploying the PPP and/or the PJD process, a first set of new parameters for a model of a device that sent the wireless transmission subject to the jamming attack event to the recipient, e.g., see operation 210. The device that sent the wireless transmission subject to the jamming attack event to the recipient may, in some approaches, be the first edge device. Note that new parameters may, in some approaches, be generated for a plurality of the edge devices of the edge environment. Accordingly, in order to determine these new parameters, in some approaches, the WMF process implements a weighted federated averaging process to aggregate parameters of respective models of the edge devices after a specified amount of epochs by averaging FM parameters with weighted contributions over an alpha of the "K" contributing edge devices. An illustrative equation that may be used to determine the new parameters is provided below.

$$\text{new\_model\_parameters} = \frac{1}{K}\sum_{i=1}^{K}(\alpha i * \text{current\_model\_parameters}) \qquad \text{Equation (1)}$$

Using Equation (1) above, generating the first set of new parameters for the model of the device that sent the wireless transmission subject to the jamming attack event to the recipient includes averaging current model parameters with weighted coefficients. The weighted coefficients may, in some approaches, be based on a determined quantification of a cleansing impact that performing the PJD process has on data of the wireless transmission subject to the jamming attack event or are based on additions and smoothing incorporated into the data of the wireless transmission subject to the jamming attack event.

Operation 212 includes causing the first set of new parameters to be distributed to the model of the device that sent the wireless transmission subject to the jamming attack event to the recipient, e.g., the first edge device or the central hub in some approaches. Although various operations of method 200 are described for an edge environment that includes the first edge device and the central hub, in some preferred approaches, the operations of method 200 may be performed for deployments of the edge environment that include a plurality of edge devices and the central hub. Accordingly, in such approaches, method 200 may include generating sets of new parameters for models used by the plurality of edge devices and causing the sets of new parameters to be distributed to the edge devices for further fine-tuning or model deployment efforts.

Various performance benefits are enabled as a result of a deployment of the techniques described herein within an edge environment. For example, in some approaches, as a result of pre-emptively protecting wireless transmissions from jammers, an amount of processing that is performed by a receiver of data of a wireless transmission is ultimately reduced. This is because the pre-emptive actions mitigate jamming attack events, and therefore, data processing resources that would otherwise be expended to perform recovery actions to recover from the jamming attack events are preserved. Furthermore, the PJD process enables relative reductions in processing that is performed to recover from jamming attack events. This is because the PJD process identifies and excludes outlier data from received data and therefore reduces an amount of data that is ultimately processed by a recipient of data of a wireless transmission.

Figure 3:
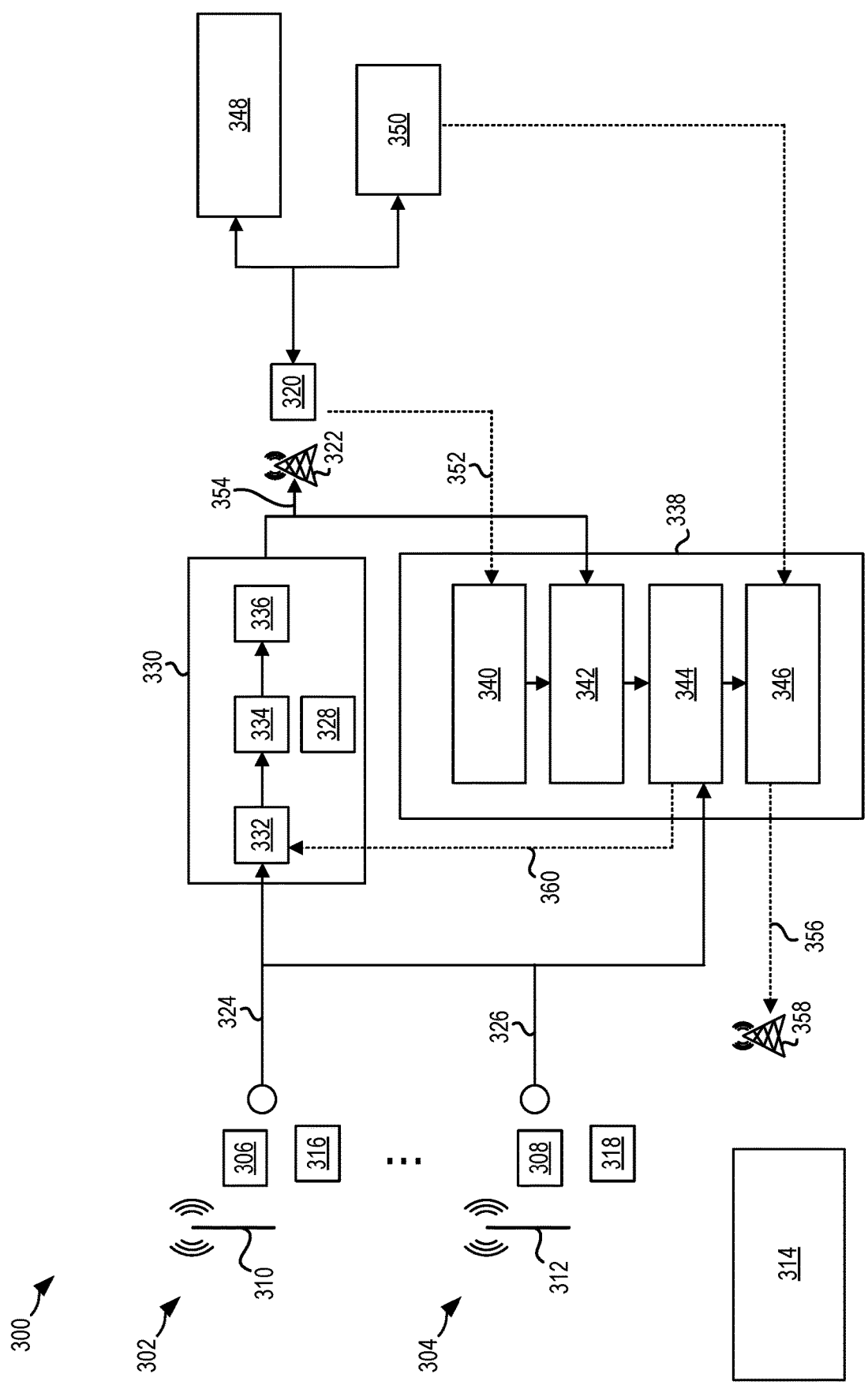
FIG. 3 is an edge environment, in accordance with one embodiment of the present invention.

FIG. 3 depicts an edge environment 300 (which is preferably an SFL environment), in accordance with one embodiment. As an option, the present edge environment 300 may be implemented in conjunction with features from any other embodiment listed herein, such as those described with reference to the other FIGS. Of course, however, such edge environment 300 and others presented herein may be used in various applications and/or in permutations which may or may not be specifically described in the illustrative embodiments listed herein. Further, the edge environment 300 presented herein may be used in any desired environment.

The edge environment 300 includes any number of edge sites, e.g., see first edge site 302 and $n^{th}$ edge site 304. The edge devices may, in some approaches, be a part of a multi-client split federated learning system with adversarial data jamming attack events, e.g., perturbation of sensitive embedding data. Each edge site includes an edge device, e.g., see edge device 306 and edge device 308 that are each configured to use associated antennas, e.g., see antenna 310 and antenna 312 and embedding blocks of a transformer-based large language model of architecture splits 314, e.g., see embedding block 316 and embedding block 318 for training one part of a split LLM (embedding block), to communicate with a central hub 320. The central hub may be in communication with other assistive cloud computing capabilities 348 and/or other LLM model splits 350 In some preferred approaches, the central hub 320 is a cellular MEC-enabled base station that has an associated antenna 322 for communicating with the edge devices. For example, the edge devices may wirelessly transmit signals that include data of model embeddings, e.g., see wireless transmission 324 and wireless transmission 326. This transmission process 330 includes a first step 332 that includes data preparation, encoding, and wireless resource mapping, a second step 334 that includes transmission over a physical wireless channel, and a third step 336 that includes wireless resource demapping, decoding and data extraction.

If the wireless transmissions were otherwise able to merely be transmitted to the central hub without taking any preemptive and/or responsive actions described herein, e.g., see method 200, the wireless transmissions may be compromised by jamming attack events initiated against the signals of the wireless transmissions by a jammer 328. However, in order to pre-emptively mitigate and/or respond to such jamming threat events, techniques described herein may be implemented in the edge environment to ensure an adaptive, resilient, and adversary-aware defense mechanisms via threat classification, data augmentation and weighted model federation. These techniques are offered in a method and system 338 for dynamic edge-AI defense mechanisms for relatively robust split federated learning systems in wireless edge environments, which includes a plurality of combined processes. For example, an MDJ process 340 includes techniques to continuously monitor and detect adversarial jamming via wireless spectrum sensing and corresponding channel measurement techniques within the distributed cellular edge system. In some approaches, the MDJ process 340 relies on wireless spectrum sensing capabilities of the central hub, e.g., see operation 352. The MDJ process 340 focuses on continuously monitoring a wireless spectrum to detect the presence of adversarial jammers. It characterizes the noise introduced by jammers, measures signal strength, and estimates the likelihood of jamming affecting specific parties, e.g., the first edge device, the nth edge device, the central hub, etc., within a SFL system of the edge environment. Furthermore, the MDJ process 340 provides insights into the jammer's behavior, signal strength, and possible affected parties. Further specific techniques for performing the MDJ process are described in greater detail elsewhere herein, e.g., see method 200.

A PJD process 342 includes techniques for eliminating the influence of an adversarial jammer by post-processing corrupted data received, e.g., see operation 354, at a receiver of the edge environment, e.g., 5G-MEC, cloud-server, etc., via K-means clustering and de-noising techniques. This post processing process aims to cleanse the received data that has been corrupted by jamming. This cleansing is achieved by analyzing data distributions and applying clustering techniques such as K-Means or DBSCAN. Furthermore, the PJD process 342 identifies corrupted data points as outliers and eliminates or filters them from the data. A result of the PJD process 342 is a cleansed dataset, and an impact of the post-processing is quantified using a predetermined alpha ratio described in greater detail elsewhere herein, e.g., see method 200.

A PPP 344 may be performed in the edge environment, and includes techniques to preemptively protect an edge device against further adversarial jamming by transforming sensitive embedding space representation via a randomized smoothing to allow for a more robust data variance and subsequent K-means clustering to distinguish potential overlapping from each other. More specifically, these techniques focus on preemptively protecting edge devices that are determined to be relatively likely to be jammed by employing data-poisoning protection mechanisms to introduce randomized noise into embedding representations. Randomized smoothing may be used to train a model that performed the PPP on noisy data and limit the effects of adversarial attacks. The PPP aims to increase the robustness of the embedding space and improve the resilience of the SFL process.

A fourth process 346 for weighed model federation includes a collaborative and weighted federated learning approach to aggregate the learned model parameters having weight coefficients that represent the importance of the model contribution considering the applied countermeasures. This process addresses the federated aggregation of edge device models, considering the impact of applied countermeasures. It furthermore introduces a weighted federated averaging algorithm that assigns weight parameters to edge device models based on their contribution's importance. The weighting factor (represented by the predetermined alpha ratio) reflects the ratio of cleansed data after the PJD process compared to the original data. This method ensures that relatively more reliable, less jammed, and data-rich model contributions are given relatively higher importance during aggregation. Further specific techniques for performing the fourth process 346 for weighed model federation are described in greater detail elsewhere herein, e.g., see method 200.

Results of performing one or more of the processes may be provided to one or more components of the edge environment. For example, operation 356 includes broadcasting the model parameters to all the edge components via antenna 358, and operation 360 includes causing robust model embeddings from the PPP to be incorporated into wireless transmissions of data performed thereafter.

Figure 4:
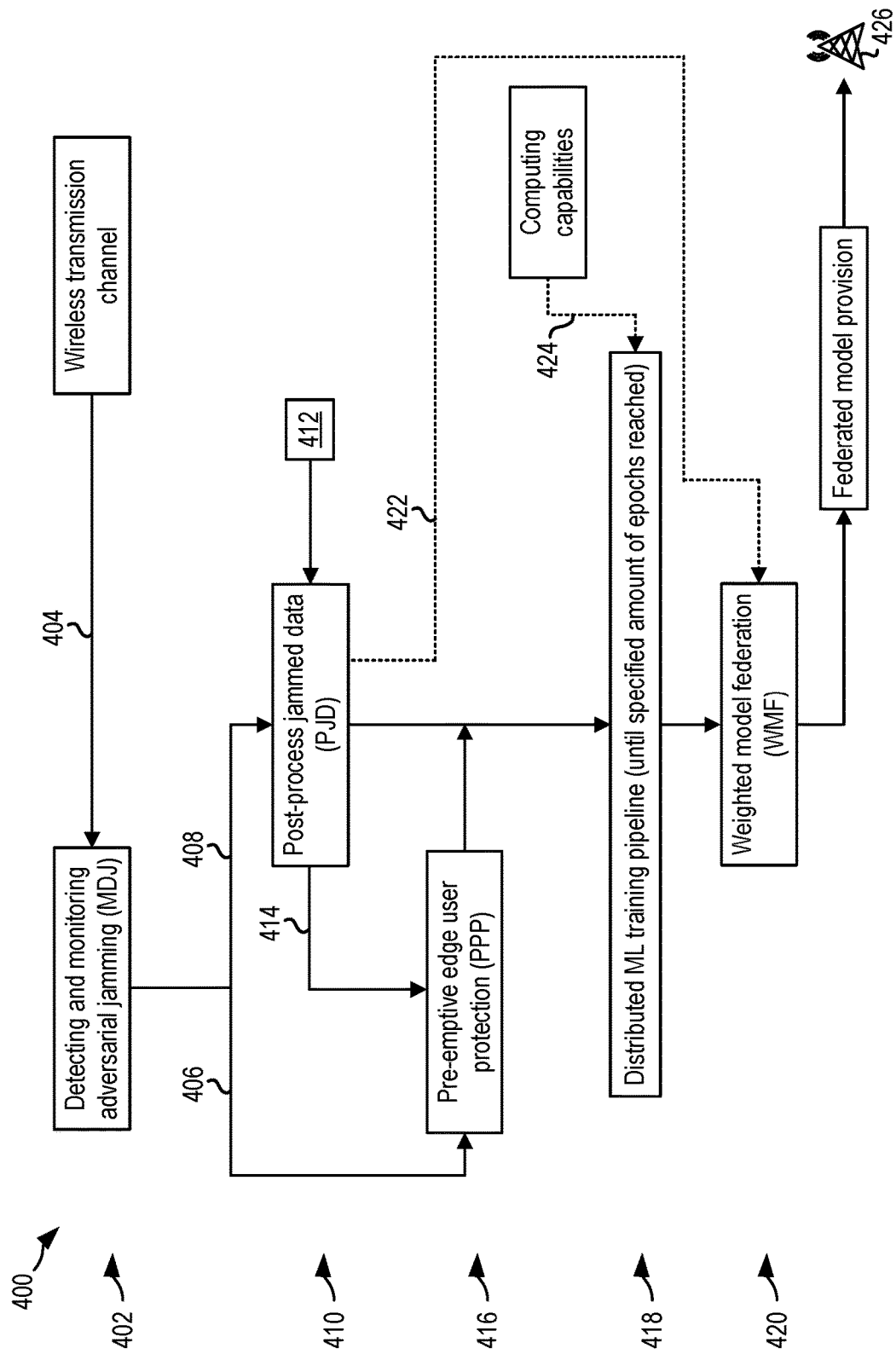
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method X00 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method X00. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 400 depicts an end-to-end workflow of techniques for dynamically performing preemptive and responsive processes for mitigating malevolent adversarial jamming attack events within an edge environment that includes at least one edge device and a central hub. Method 400 is described with respect to five operative steps, although, depending on the approach, method 400 may include one or more of the operative steps.

In a first operative step 402 of method 400, wireless spectrum sending results, anomalies and KPIs, that are associated with a wireless transmission channel, e.g., a 5G antenna channel, are obtained, e.g., see operation 404. An MDJ process may be performed to continuously monitor a wireless spectrum to detect the presence of adversarial jammers. Illustrative techniques for performing the MDJ process are described elsewhere herein, e.g., see method 200. A determination may be made as to whether a jamming attack event is likely to occur or has already occurred. In some approaches, an attack may be determined to be relatively likely to occur based on results of performing the MDJ process, which may include a probability mapping of one or more edge user device's likelihood of being attacked, e.g., see logical path 406 that may be followed in response to a determination that such an attack is relatively likely to occur. In contrast, in some approaches, wireless performance data, e.g., on signal strength, noise levels, etc., may be used to determine that a jamming attack event has occurred, e.g., see logical path 408 that may be followed in response to a determination that such an attack has occurred.

In a second operative step 410 of method 400, a PJD process is performed in response to a determination that a jamming attack event has occurred. Techniques for performing the PJD process are described elsewhere herein, e.g., see method 200. In some approaches, the PJD process includes using a clustering algorithm from a predetermined database 412 of clustering algorithms. The second operative step 410 may proceed to the PPP in some optional approaches, e.g., see logical path 414.

In a third operative step 416 of method 400, a PPP process may be performed in response to a determination that a jamming attack event is likely to occur. Thereafter, a WMF process may be performed in a fifth operative step 420 of method 400. In some approaches, the WMF process uses a cleansed dataset ratio, which may be determined in the PJD process, e.g., see operation 422. In order to determine new parameters for the edge devices, in some approaches, the WMF process implements a weighted federated averaging process in a distributed ML training pipeline during which parameters of respective models of the edge devices are aggregated after a specified amount of epochs are reached, e.g., see optional fourth operative step 418 of method 400. In some approaches, computing capabilities may be sourced from predetermined resources in order to perform the optional fourth operative step 418, e.g., see operation 424.

Results of performing the WMF process, e.g., the new parameters provisions for a FM, may be distributed to the edge devices. In some approaches, an antenna 426 may be used to broadcast the new parameters to the edge devices.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
    performing a detecting and monitoring adversarial jamming (MDJ) process for an edge environment that includes a first edge device and a central hub;
    in response to a determination, based on results of performing the MDJ process, that a jamming attack event is likely to occur, causing a pre-emptive edge user device protection process (PPP) to be deployed for preventing the jamming attack event;
    in response to a determination, based on the results of performing the MDJ process, that a jamming attack event has occurred, causing a post-process jammed data (PJD) process to be deployed at a recipient of a wireless transmission subject to the jamming attack event;
    generating, based on results of deploying the PPP and/or the PJD process, a first set of new parameters for a model of a device that sent the wireless transmission subject to the jamming attack event to the recipient; and
    causing the first set of new parameters to be distributed to the model of the device that sent the wireless transmission subject to the jamming attack event to the recipient.

2. The CIM of claim 1, wherein the edge environment includes a plurality of edge devices including the first edge device, wherein performing the MDJ process for the edge environment includes:
    evaluating wireless transmissions within the edge environment;
    identifying, based on results of the evaluation, anomalies that have occurred during the wireless transmissions;
    determining, based on the identified anomalies, the edge devices that are potentially under threat of jamming attack events and a potential range of the jamming attack events; and
    constructing, for each of the edge devices, a probability mapping, wherein each of the probability mappings detail, for an associated one of the edge devices, a likelihood of the jamming attack events affecting the associated edge device.

3. The CIM of claim 2, wherein the probability mappings includes insights about the jamming attack events, wherein the insights are selected from the group consisting of: behavior of a malevolent device that initiates at least one of the jamming attack events, signal strength of a wireless transmission subject to the jamming attack event, and a list of the edge devices that are threatened by the jamming attack event, and further comprising:
    generating, based on results of deploying the PPP and/or the PJD process, sets of new parameters for models of the edge devices; and
    causing the sets of new parameters to be distributed to the edge devices.

4. The CIM of claim 1, wherein deployment of the PPP includes:
    determining a suitable number of redundant samples to be added to data that is to be wirelessly transmitted between the first edge device and the central hub;
    determining an intentional noise level to add to the data;
    applying randomized smoothing during wireless transmission of the data between the first edge device and the central hub; and
    applying data clustering in response to a determination that the data has been wirelessly transmitted between the first edge device and the central hub.

5. The CIM of claim 4, wherein applying data clustering includes identifying portions of the data that qualify as outliers from a remainder of the data, and instructing a recipient of the data wirelessly transmitted between the first edge device and the central hub to ignore the identified portions of the data.

6. The CIM of claim 1, wherein deployment of the PJD process includes:
    determining an optimal clustering of data of the wireless transmission subject to the jamming attack event;
    discarding portions of the data that are identified during the determination of the optimal clustering to qualify as outliers; and
    determining a quantification of a cleansing impact that performing the PJD process has on the data of the wireless transmission subject to the jamming attack event.

7. The CIM of claim 6, wherein determining the optimal clustering of the data of the wireless transmission subject to the jamming attack event includes:
    evaluating potential clustering guidance from previously performed data-centric analysis;
    determining clustering parameters to use for determining the optimal clustering of the data;
    selecting a clustering algorithm to use for determining the optimal clustering of the data; and
    causing the selected clustering algorithm to run on the data of the wireless transmission subject to the jamming attack event, wherein portions of the data identified by the selected clustering algorithm to lie outside of determined clusters are identified to qualify as outliers.

8. The CIM of claim 1, wherein generating the first set of new parameters for the model of the device that sent the wireless transmission subject to the jamming attack event to the recipient includes averaging current model parameters with weighted coefficients.

9. The CIM of claim 8, wherein the weighted coefficients are based on a determined quantification of a cleansing impact that performing the PJD process has on data of the wireless transmission subject to the jamming attack event or are based on additions and smoothing incorporated into the data of the wireless transmission subject to the jamming attack event.

10. A computer program product (CPP), the CPP comprising:
a set of one or more computer-readable storage media;
program instructions, collectively stored in the set of one or more storage media, for causing a processor set to perform the following computer operations:
perform a detecting and monitoring adversarial jamming (MDJ) process for an edge environment that includes a first edge device and a central hub;
in response to a determination, based on results of performing the MDJ process, that a jamming attack event is likely to occur, cause a pre-emptive edge user device protection process (PPP) to be deployed for preventing the jamming attack event;
in response to a determination, based on the results of performing the MDJ process, that a jamming attack event has occurred, cause a post-process jammed data (PJD) process to be deployed at a recipient of a wireless transmission subject to the jamming attack event;
generate, based on results of deploying the PPP and/or the PJD process, a first set of new parameters for a model of a device that sent the wireless transmission subject to the jamming attack event to the recipient; and
cause the first set of new parameters to be distributed to the model of the device that sent the wireless transmission subject to the jamming attack event to the recipient.

11. The CPP of claim 10, wherein the edge environment includes a plurality of edge devices including the first edge device, wherein performing the MDJ process for the edge environment includes:
evaluating wireless transmissions within the edge environment;
identifying, based on results of the evaluation, anomalies that have occurred during the wireless transmissions;
determining, based on the identified anomalies, the edge devices that are potentially under threat of jamming attack events and a potential range of the jamming attack events; and
constructing, for each of the edge devices, a probability mapping, wherein each of the probability mappings detail, for an associated one of the edge devices, a likelihood of the jamming attack events affecting the associated edge device.

12. The CPP of claim 11, wherein the probability mappings includes insights about the jamming attack events, wherein the insights are selected from the group consisting of: behavior of a malevolent device that initiates at least one of the jamming attack events, signal strength of a wireless transmission subject to the jamming attack event, and a list of the edge devices that are threatened by the jamming attack event, and further comprising:
program instructions, collectively stored in the set of one or more storage media, for causing the processor set to perform the following computer operations:
generate, based on results of deploying the PPP and/or the PJD process, sets of new parameters for models of the edge devices; and
cause the sets of new parameters to be distributed to the edge devices.

13. The CPP of claim 10, wherein deployment of the PPP includes:
determining a suitable number of redundant samples to be added to data that is to be wirelessly transmitted between the first edge device and the central hub;
determining an intentional noise level to add to the data;
applying randomized smoothing during wireless transmission of the data between the first edge device and the central hub; and
applying data clustering in response to a determination that the data has been wirelessly transmitted between the first edge device and the central hub.

14. The CPP of claim 13, wherein applying data clustering includes identifying portions of the data that qualify as outliers from a remainder of the data, and instructing a recipient of the data wirelessly transmitted between the first edge device and the central hub to ignore the identified portions of the data.

15. The CPP of claim 10, wherein deployment of the PJD process includes:
determining an optimal clustering of data of the wireless transmission subject to the jamming attack event;
discarding portions of the data that are identified during the determination of the optimal clustering to qualify as outliers; and
determining a quantification of a cleansing impact that performing the PJD process has on the data of the wireless transmission subject to the jamming attack event.

16. The CPP of claim 15, wherein determining the optimal clustering of the data of the wireless transmission subject to the jamming attack event includes:
evaluating potential clustering guidance from previously performed data-centric analysis;
determining clustering parameters to use for determining the optimal clustering of the data;
selecting a clustering algorithm to use for determining the optimal clustering of the data; and
causing the selected clustering algorithm to run on the data of the wireless transmission subject to the jamming attack event,
wherein portions of the data identified by the selected clustering algorithm to lie outside of determined clusters are identified to qualify as outliers.

17. The CPP of claim 10, wherein generating the first set of new parameters for the model of the device that sent the wireless transmission subject to the jamming attack event to the recipient includes averaging current model parameters with weighted coefficients.

18. The CPP of claim 17, wherein the weighted coefficients are based on a determined quantification of a cleansing impact that performing the PJD process has on data of the wireless transmission subject to the jamming attack event or are based on additions and smoothing incorporated into the data of the wireless transmission subject to the jamming attack event.

19. A computer system (CS), the CS comprising:
a processor set;
a set of one or more computer-readable storage media;
program instructions, collectively stored in the set of one or more storage media, for causing the processor set to perform the following computer operations:
perform a detecting and monitoring adversarial jamming (MDJ) process for an edge environment that includes a first edge device and a central hub;
in response to a determination, based on results of performing the MDJ process, that a jamming attack event is likely to occur, cause a pre-emptive edge user device protection process (PPP) to be deployed for preventing the jamming attack event;
in response to a determination, based on the results of performing the MDJ process, that a jamming attack event has occurred, cause a post-process jammed data (PJD) process to be deployed at a recipient of a wireless transmission subject to the jamming attack event;

generate, based on results of deploying the PPP and/or the PJD process, a first set of new parameters for a model of a device that sent the wireless transmission subject to the jamming attack event to the recipient; and cause the first set of new parameters to be distributed to the model of the device that sent the wireless transmission subject to the jamming attack event to the recipient.

20. The CS of claim 19, wherein the edge environment includes a plurality of edge devices including the first edge device, wherein performing the MDJ process for the edge environment includes:

evaluating wireless transmissions within the edge environment;

identifying, based on results of the evaluation, anomalies that have occurred during the wireless transmissions;

determining, based on the identified anomalies, the edge devices that are potentially under threat of jamming attack events and a potential range of the jamming attack events; and constructing, for each of the edge devices, a probability mapping, wherein each of the probability mappings detail, for an associated one of the edge devices, a likelihood of the jamming attack events affecting the associated edge device.

\* \* \* \* \*